(12) United States Patent
Collet et al.

(10) Patent No.: US 8,312,494 B2
(45) Date of Patent: Nov. 13, 2012

(54) PRESENTING A CONTINUOUS PROGRAMMING SEQUENCE AT A CLIENT TERMINAL

(75) Inventors: Jean-Luc Collet, La Gaude (FR); Francois-Xavier Drouet, La Gaude (FR); Fabien Lanne, Valbonne (FR); Gerard Marmigere, Drap (FR)

(73) Assignee: International Business Machines Corporation, Armonk, NY (US)

( * ) Notice: Subject to any disclaimer, the term of this patent is extended or adjusted under 35 U.S.C. 154(b) by 411 days.

(21) Appl. No.: 12/256,567

(22) Filed: Oct. 23, 2008

(65) Prior Publication Data

US 2009/0113512 A1 Apr. 30, 2009

(30) Foreign Application Priority Data

Oct. 26, 2007 (EP) .................................. 07301498

(51) Int. Cl.
*H04N 7/173* (2011.01)
(52) U.S. Cl. ........................ 725/97; 725/114; 386/292
(58) Field of Classification Search .................... 725/97, 725/114; 386/238, 292
See application file for complete search history.

(56) References Cited

U.S. PATENT DOCUMENTS

| 5,892,535 A * | 4/1999 | Allen et al. ..................... 725/36 |
| 6,642,938 B1 | 11/2003 | Gilboy |
| 6,760,538 B1 * | 7/2004 | Bumgardner et al. ........ 386/291 |
| 2002/0056103 A1 * | 5/2002 | Gong .............................. 725/39 |
| 2002/0066106 A1 * | 5/2002 | Kanojia et al. ................. 725/87 |
| 2002/0144267 A1 | 10/2002 | Gutta et al. |
| 2005/0028206 A1 * | 2/2005 | Cameron et al. ............... 725/46 |
| 2005/0120369 A1 | 6/2005 | Matz |
| 2005/0251842 A1 | 11/2005 | Benliyan |
| 2006/0010467 A1 | 1/2006 | Segel |
| 2006/0174269 A1 * | 8/2006 | Hansen-Turton ............... 725/39 |

FOREIGN PATENT DOCUMENTS

| WO | WO 00/40026 | 7/2000 |
| WO | WO 2005/074284 A1 | 8/2005 |

* cited by examiner

*Primary Examiner* — Robert Hance
(74) *Attorney, Agent, or Firm* — Hoffman Warnick LLC; Douglas A. Lashmit

(57) ABSTRACT

A method and system of presenting a continuous programming sequence at a client terminal, e.g., a set top box. A method in accordance with an embodiment includes: defining a programming sequence at a server; and the server instructing the client terminal associated with the programming sequence to retrieve a first program item specified in the programming sequence from a specified location.

13 Claims, 11 Drawing Sheets

|  | 17H | 18H | 19H | 20H | 21H | 22H | 23H | 24H | 1H |
|---|---|---|---|---|---|---|---|---|---|
| Monday | | Cartoon Walt Disney 50% | | | Info A2 Direct | Film Western 25% Triller 50% Adventure 25% | | | |
| Tuesday | | Cartoon | | Documentary Scientific 15% Geographical 50% Ethnic 35% | | Info A2 Diferred | Sport Rugby 15% Football 50% Car race 35% | | |
| Wednesday | | Cartoon | | | Info A2 Direct | Film Historic 25% Triller 50% Adventure 25% | | | |
| Thursday | | Sport Rugby 15% Football 50% Car race 35% | | | Info A2 Direct | Documentary Scientific 15% Geographical 50% Ethnic 35% | Sport Rugby 15% Football 50% Car race 35% | | |
| Friday | | Documentary Scientific 15% Geographical 50% Ethnic 35% | | | Cartoon | | Info A2 Diferre | Documentary Scientific 15% Geographical 50% Ethnic 35% | |
| Saturday | | Cartoon | | | Info A2 Direct | Film Western 25% Triller 50% Adventure 25% | | | |
| Sunday | | Sport Tennis 15% Football 50% Car race 35% | | | Cartoon | | Info A2 Diferred | Documentary Scientific 15% Geographical 50% Ethnic 35% | |

*Figure 4*

PRESENTING A CONTINUOUS PROGRAMMING SEQUENCE AT A CLIENT TERMINAL

FIELD OF THE INVENTION

The present invention relates to the field of on demand content distribution, and in particular to the provision of personalized content channels, such as TV channels.

BACKGROUND OF THE INVENTION

The term IPTV widely used in this document stands for Internet Protocol Television and is an umbrella term describing TV and video delivered using Internet technology instead of normal linear RF broadcast. A typical IPTV solution as shown in FIG. 1 relies on a network IP infrastructure and is based on three main components.
1. Head end equipment 110 which includes the content providers and the specific equipment needed to transmit and receive digital assets (satellite receiver, encoders, etc.). Such equipment is responsible to ensure the transport of digital assets onto the IP network.
2. Middleware equipment 120 ensures digital assets content delivery. It provides the portal and services such as video on demand (VOD), any may be installed close to a digital subscriber line access multiplexer (DSLAM). End-users consume such digital assets using various devices installed locally.
3. The customer premises side comprises terminal equipment enabling access to services, and may include residential gateway (Modem) functionality, IP or analog phone functionality, etc. The terminal may take the form of a television set top box (STB), personal computer (PC), or other such device. Record and/or replay functionality may also be provided at the terminal.

While described above in the context of a domestic reception environment, VOD may of course be provided for other devices such as mobile phones, PDAs, car embedded devices, etc. While described in the context of a VOD system, equivalent provisions may be made for the distribution of any digital content.

Conventional VOD is based on a unicast mechanism (one to one connection) and uses for example the RTSP protocol (RFC 2026) as described in more detail hereafter to manage the user requests, wherein the program recorded has to be indexed via trick file mechanisms, necessary for fast forward, fast rewind, play and pause features.

TV broadcast (TVB) over IP is based on a multicast mechanism (one to many connection) and uses for example the IGMP protocol (RFC 1112) as described in more detail hereafter to manage user requests.

Transmission Modes

Unicast provides a one to one connection (one stream) between a user (STB/PC) and a video server. The user can ask via a fast-rewind/fast forward command on a remote control to accelerate or reverse the content playback. Such commands are sent via RTSP for example.

Multicast provides one connection to all the users belonging to the multicast group. The stream is sent via the network and then the users can subscribe to be part of the multicast via an IGMP command. In this case, we have one stream or n users.

IP multicasting is the transmission of an IP datagram to a "host group", i.e., a set of zero or more hosts identified by a single IP destination address. A multicast datagram is delivered to all members of its destination host group with the same "best-effort" reliability as regular unicast IP datagrams, i.e., the datagram is not guaranteed to arrive intact at all members of the destination group or in the same order relative to other datagrams.

The membership of a host group is dynamic; that is, hosts mayjoin and leave groups at any time. There is no restriction on the location or number of members in a host group. A host may be a member of more than one group at a time. A host need not be a member of a group to send datagrams to it.

Real Time Streaming Protocol

Real time streaming protocol (RTSP) is an Internet Engineering Task Force (IETF) proposed standard for controlling streaming media (see RFC 2326). It describes a set of messages that enable the efficient delivery of streamed multimedia over Internet protocol (IP) networks. RTSP works with established protocols, such as the real time transport protocol (RTP—see RFC 1889) and hypertext transfer protocol (HTTP), to provide an integrated approach to streaming media over the Internet.

In a VOD context, a client asks a server for media streaming using VCR-style asset controls such as play, fast-forward, fast-rewind, and pause. To implement these actions, the server use RTSP message pairs which consist of a client request and a server response. One client action can cause more than one TSP message pair to be sent. FIG. 2 summarizes the main verbs used in the RTSP protocol.

A user at client terminal 130 opens a program item with the DESCRIBE 200 and SETUP 202 requests. The server's DESCRIBE response 201 provides parameters related to the media of the program item, such as the audio header and duration. The SETUP message 202 transmits transport parameters and establishes a session with a unique session ID. Once a program item is open, the client terminal can play it in normal, fast-forward, or rewind mode by sending a PLAY request 204 with a scale parameter that indicates the mode and speed. A PAUSE request 206 may also be sent to pause the program item. Finally, a TEARDOWN request 208 causes the client terminal to exit. Like HTTP, RTSP is text-based and a simple use case of the client/server dialog.

IP Multicast

IP multicast provides an efficient one-to-many delivery service. To achieve one-to-many delivery using IP unicast traffic, each datagram needs to be sent multiple times. To achieve one-to-many delivery using IP broadcast traffic, a single datagram is sent, but all nodes process it, even those that are not interested. With IP multicast, a single datagram is sent and forwarded across routers only to the network segments containing nodes that are interested in receiving it.

Historically, IP multicast traffic has been little utilized. However, recent developments in audio and video teleconferencing, distance learning, and data transfer to a large number of hosts have made IP multicast traffic more important.

More and more video content is available to users, either on the Internet available for download/streaming or on linear programming from broadcast operators (satellite/cable/IPTV). Navigating this content, be it on PC or on digital decoders to find what the user would like to watch can be complex and time consuming. Searching the Internet with a search engine, watching what you want, searching again, makes a complex user experience that is not compatible with the "lean-back" attitude of most TV viewers today.

A number of prior art approaches can be identified. The first group of prior art approaches are based on personal computers running browser software and include video sections of search engines that can be searched with keywords, and user-generated content video site that have integrated a concept of search on tags (metadata) entered at video ingest-time. A second group of solutions meanwhile is TV/STB based, and includes the integrated keyword search offered by IPTV Service Providers for their linear program electronic programming guide (EPG) and video on demand catalogues, and the "keyword" search enabled by satellite/cable operators in their EPGs.

All of these approaches are based on users inputting keywords, then retrieving a list of candidate content, selecting which one candidate to watch and then re-iterating the experience. It is desirable to create a different experience where the user can lean-back and enjoy content profiled to his taste in a real TV experience.

A number of partial solutions to this problem are provided by the prior art.

U.S. Pat. No. 6,642,938 relates to a method and system for real time personal TV channels which enables a set top box to automatically select from a number of channels so as to display the one that a user has selected as being of interest at a particular time of the day. Alternatively, the viewer may specify a set of keywords or topics of interest that the set-top box can use to ascertain a preferred set of programs. The set top box can match these keywords or topics of interest against upcoming television programming by reference to an on-line television guide or programming information which may be digitally encoded in each channel's vertical blanking interval. In addition, the viewer's viewing history may be analyzed to identify the interests of the viewers based on time of broadcast and this information may be used for identifying preferred programs. Thereafter, the system scrutinizes the broadcast feed from CTV, DTV, or Internet link to create a personalized channel which displays the preferred programs irrespective of the actual channel.

US 2005/0120369 discloses a method and system for presenting personalized channel content in a distributed network. A server device transmits several channels with tags attached to them which are indicative of the content of the channels. A client device, such as a TV receives the tagged content and parses the tags to evaluate the tags. The client device stores a user profile which contains user preferences such as type of preferred content, weighting of the content, time of viewing, etc. The user profile is created manually or created automatically based on viewing history. The evaluated tags are compared to the user profile to identify the content matching the user preferences. The preferred content is repackaged into a personalized channel and presented to the user independently. Alternatively, the evaluated tags may be used to create a personalized EPG which displays one or more personalized channels, each of the personalized channels different personalized content extracted using the user profile.

WO0040026A1 describes an electronic program scheduling system for providing personalized TV channels. A program database is used to store program information for a plurality of programs, available on a plurality of real time channels including for each program the program start time, end time, information characterizing the content of the program. A set top box (STB) is used by a viewer to store preference information characterizing an individual user's preferred programs. Using the preference information and information from the program database a schedule is generated for the personal channel. This schedule is used to select and receive at the scheduled start time, the content from the real channel which is displayed through TV as a personal channel in a similar way as a real time program channel.

US 2002/0144267 discloses a method and system for dynamic creation of personalized channels. A personal channel can be configured by a viewer by specifying explicit information regarding the viewer's viewing preferences such as TV shows and their corresponding channels and show timings, etc. Alternatively, the viewer's habits may be implicitly be used to configure the personal channel. The system uses the viewer's preferences to display the personal channel which can be accessed by the viewer like any other regular channel. Additionally, the viewer may record the content being shown on the personal channel. The personal channel is also provided with a split screen to allow the viewer view more than one program that is scheduled for same time slot.

WO05074284A1 discloses a method and system for a personalized broadcast service. One or more user devices are connected to a broadcasting service, which is in turn is connected to one or more content providers. User profile information is transmitted to the broadcasting which in turn analyzes content indicative data provided by the content providers to identify the content preferred to view by the user. The content indicative data comprises EPG and associated metadata. Accordingly, a record scheduling is generated and the user devices record the preferred programs based on the schedule. The user profile information is used to schedule presentation of the recorded content at the user devices.

US 2006/0010467 discloses a method and system for personalized video entertainment. Viewer preferences are created either manually or by analyzing the viewing history. The viewer preferences are used to store video contents in a video server and then create a content sequence. The stored video content is then played in successive order when selected for viewing by the viewer. The stored video content is played just like a TV channel, when one program ends, another program start automatically. In addition, the viewer can use RSTP commands to scroll backward or forth or to skip to new content. The system also supports switching between active channels and the recorded content by using regular channel switching mode.

US 2005/0251842 discloses a method and system for providing a personalized TV channel for multiple users. One or more users are connected via a network for receiving user parameters, preferences, etc. A personalized TV channel is generated in real time for each user by using user parameters and by selectively including preferences from other users. The personalized TV channel is transmitted in real time to other users in the network.

The article entitled "Personalized TV program recommendation based on TV-anytime metadata" by Hongguang Zhang; Shibao Zheng available from http://ieeexplore.ieee.org/xpl/freeabs_alljsp?arnumber=1502378) discusses how the expansion of TV channels in digital era is resulting in a soaring number of program contents available to viewers. The advent of the personal digital recorder makes users face more viewing selections. Besides watching a program that is being broadcast, users can select something favorite to record so that they can watch these contents whenever they like. Viewers are really exposed to TV program overload. Consequently, personalized TV recommendations are necessary to automatically customize program listings. This paper proposes a personalized TV system based on TV-Any time metadata model. In addition to the traditional functions, such as program navigation and search, this system is characterized by recommending program with high preferences that are automatically generated on the basis of usage history.

SUMMARY OF THE INVENTION

The present invention presents a continuous programming sequence at a client terminal, delivers a fluid end-user experience much closer to the way users are used to experience TV today, and allows users to define which kind of content they like and then transparently this content will be arranged in a linear programming model. The resulting experience for the end-user is that they will have the "regular TV channels" plus additional channels specifically tailored to their needs that will "play just for them" the programs they want. Depending of asset to be played, the transmission may be in point to point (like VOD) or in multicast, if the asset correspond to the program of a regular chain at the same time. This will be achieved by means of "linearization" of content.

The solution is specifically described in an IP environment ("IPTV"), and is retroactively compatible with the existing installed base of IPTV set top boxes that already support IP, a web browser, an RTSP and IGMP stacks and an mpeg decoder.

Further advantages of the present invention will become clear to the skilled person upon examination of the drawings and detailed description. It is intended that any additional advantages be incorporated herein.

BRIEF DESCRIPTION OF THE DRAWINGS

Embodiments of the present invention will now be described by way of example with reference to the accompanying drawings in which like references denote similar elements.

FIG. 4 shows schematically a programming template for one week.

DETAILED DESCRIPTION OF THE INVENTION

There is provided an environment in which end-users may be given simple tools to define their own content channel, and logic for arranging content in "play lists". A typical scenario that this approach might allow, for example:

a user created list of personal channels;

a hobby channel combining gardening, cooking, and DIY programs;

a "teen channel" combining extreme sports and clips; and a "kids channel" combining cartoons an educational programs.

After creation, these channels will be available permanently to the user and channel hopping can be done to any of them just like one would "zap" to a conventional TV channel.

Figure 1:
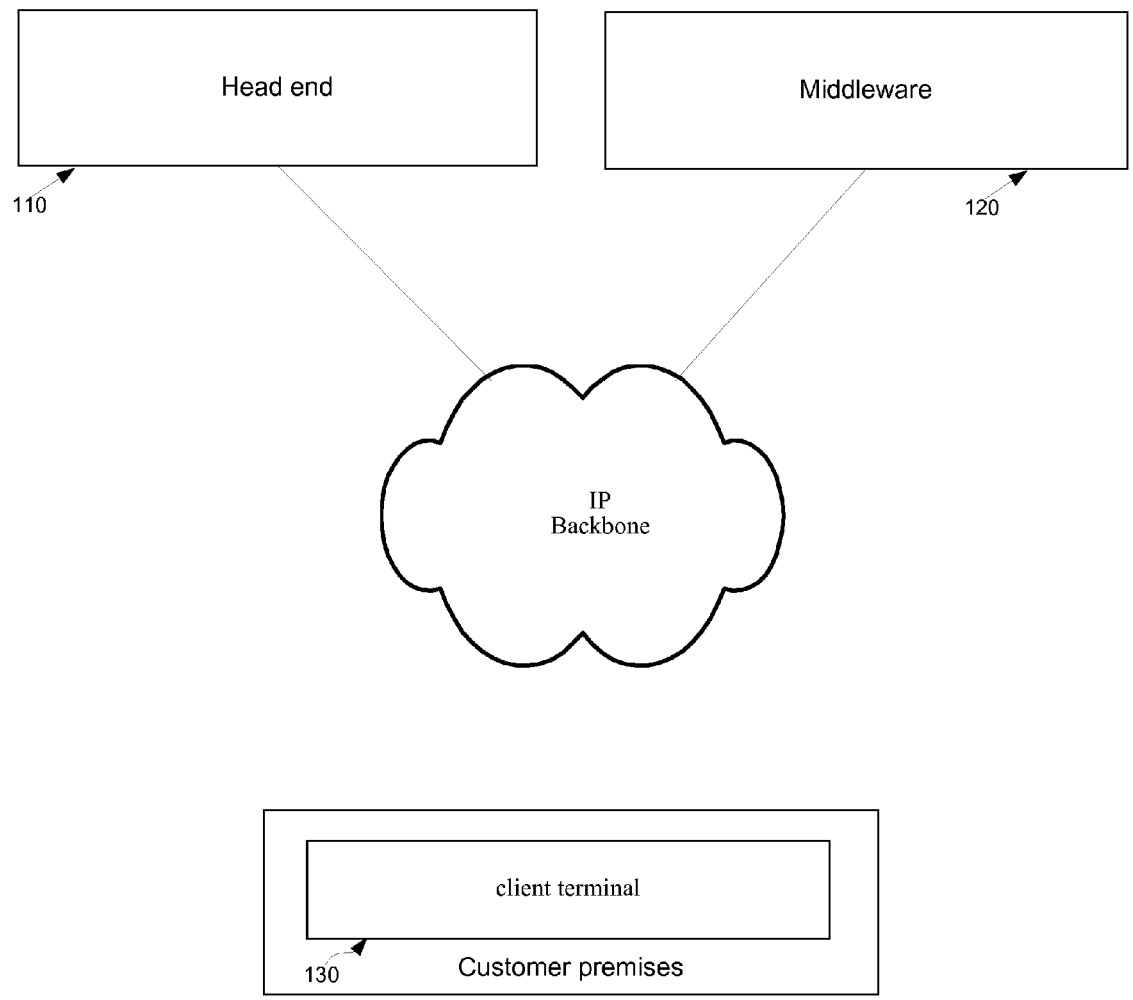
FIG. 1 shows a typical video on demand (VOD) solution.
Figure 2:
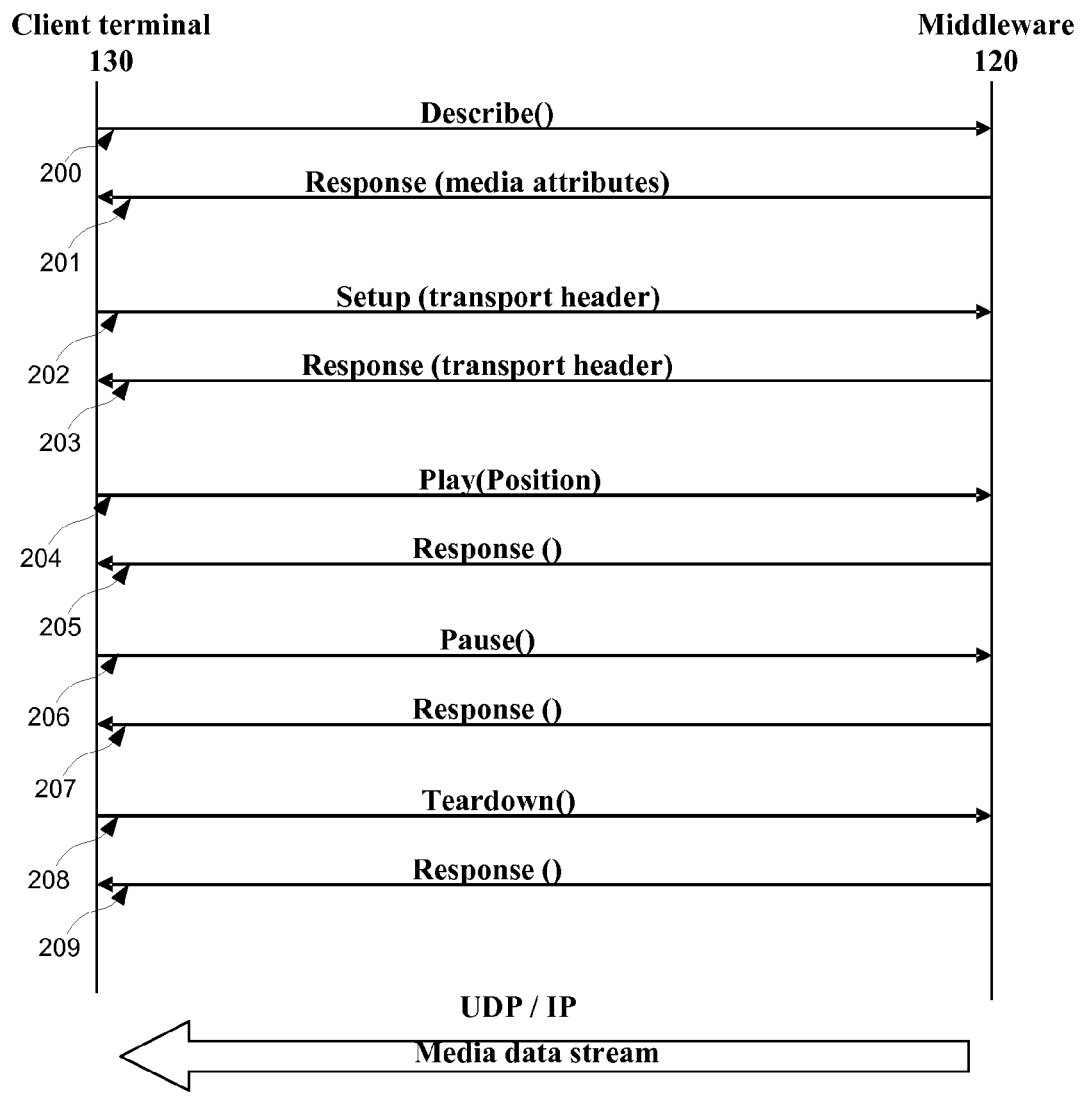
FIG. 2 summarizes the main verbs used in the RTSP protocol.
Figure 3:
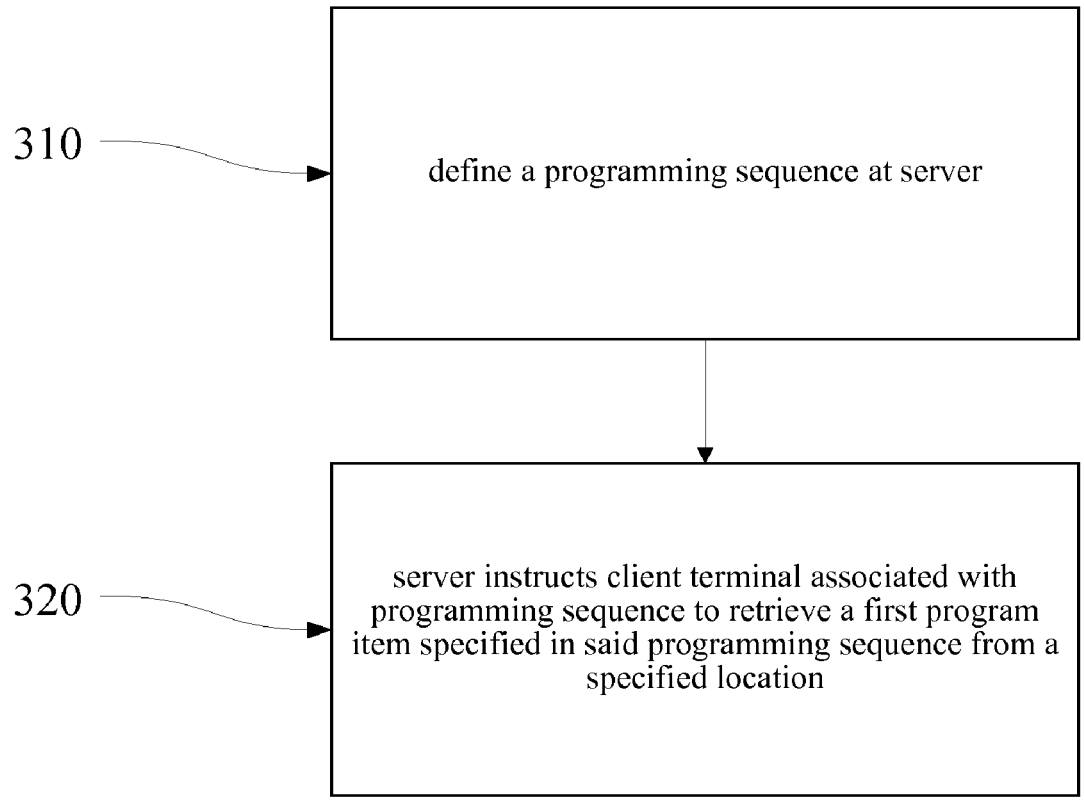
FIG. 3 shows a first embodiment of the present invention.

There is in particular provided a method of selecting a program item, for example for playback or display to a user. FIG. 3 shows a first embodiment of the present invention. As shown in FIG. 3, the method begins at a step 310 of defining a programming sequence at a server. This programming sequence may comprise a plurality of sequential time slots, each time slot being associated with a particular content type selected from a standard program content classification structure.

The predetermined period may be twenty-four hours, one week, one month, one year, or any other convenient period of time over which a programming template may be defined. Ideally the period will be such that each iteration of the period coincides with regularly repeated events in the user's life. For example a twenty four hour period will include meal time, bed times, viewing watersheds, and so on. By extending the period to a week, the pattern can also take into account weekend patterns, and other days of particular significance. If the pattern is defined for a full year public holidays, religious festivals and so on may also be taken into account. A multi level mechanism may be envisaged for which a shorter period such as 24 hours is defined to start with, and then duplicated to complete a longer period such as a week, which may then be edited to allow for exceptional events in that longer period. This process may be iterated repeatedly until the full programming template has been populated.

The standard program content classification structure may be any suitable taxonomy. An example of such a taxonomy is that for the TV-Anytime system. A genre dictionary is provided in appendix B of the specification of the TV-Anytime standard which is available from http://xml.coverpages.org/tvAnytime.html. This dictionary defines a three level hierarchy according to which video content is classified by subject. Further levels of hierarchy providing further subject classifications may be envisaged. Other classification schemes taking into account other factors such as age suitability, tone, participating parties etc may also be envisaged.

According to certain embodiments, a user may create his own channel by defining a programming template. Such a programming template may be used later to generate a personalized EPG. According to this embodiment, the predetermined period of the programming template described hereafter is a week (7×24 h). Each time slot of program is defined by a day, a start time, and a permission or not to shift the start time. Duration of a slot of a program is defined by the start time of the next slot. Each time slot may be of the same duration, or timeslots of different durations may be predefined for different times of the day or week. The user may freely define the duration of time slots as he sees fit. A plurality of content types may be associated with a respective time slot. Where this is the case, weightings may be associated with each associated content type. These weightings may then be used in a step of selecting as described hereafter. Each timeslot may contain a list which defines a genre with a type (film, news, magazine, series, . . . ), a desirability weighting and a preferred source (case where a program of a TV channel has to be inserted in the P-EPG). Genre itself may contains several Subgenre with a category like "western", "thriller", "comics", . . . for film or "economic", "scientific", "travel", . . . for magazine. SubGenre indications may also have a desirability weighting. Subgenre may contain two directives Restrict and Exclude which may be used to refine searching for suitable content.

A markup language such as an XML based language may be used to define the programming template, for example as shown below.

<restrict>
    <production_year>1960-1970</production_year>
    <artist>John Wayne, Gary Grant</artist>

```
    <restrict>
    <Exclude>
        <origin>Italian,japan</origin>
    </Exclude>
```

This in turn may be used to generate a database search request for the identification of candidate program items, for example if the form of an SQL query as shown below:

```
SELECT production_year,artist,origin
    FROM Film-table
        WHERE (production_year between 1960 and 1970)
        and (artist IN ('John Wayne ', ' Gary Grant.'))
        and (origin NOT IN ('Italy','Japan')
        )
```

The follows a more complete XML sample with the structure of the language to describe a Personal EPG template.

```
01] < EPG-Template>
02]    <Program day=Monday Start_time=6.30 shiftable=no>
03]    <Genre type=Film rate=50>
04]        <SubGenre Category=Western rate=25>
05]        <restrict>
06]            <production_year>1960-1970</production_year>
07]            <artist>John Wayne, Gary Grant</artist>
08]        </restrict>
09]        <Exclude>
10]            <origin>Italy,Japan</origin>
11]        </Exclude>
12]        </SubGenre>
13]        <SubGenre Category=Triller rate=25>
14]        </SubGenre>
15]        <SubGenre Category=Comic rate=50>
16]        </SubGenre>
17]    </Genre>
18]    <Genre type=Series rate=50>
19]    </Genre>
20]    </Program>
21]    <Program day=Monday Start_time=8 shiftable=no>
22]        <Genre type=News >
23]            <SouceTV channel=Euronew/>
24]        </Genre>
25]    </Program>
26]    <Program day=Monday Start_time=8.30 shiftable=forward>
27]        <Genre type=cartoons >
28]            <SubGenre Category=WaltDisney rate=50>
29]            </SubGenre>
30]            <SubGenre Category=Manga rate=50>
31]            </SubGenre>
32]        </Genre>
33]    ....
34]    ....
35]</EPG-Template>
```

At lines 01 and 35 the tag <EPG-Template> encloses the complete personal EPG template, which will be used periodically to generate the personal EPG. At lines 02 and 20 the tag <Program> encloses the firstly described program time slot which is valid every Monday and which starts strictly at 6 h30. This program cannot be shifted, as indicated by the parameter "shiftable", which is set to "No".

Lines 03 to 19 describe the kind of content or program to be associated with particular time slots. As shown, two kinds of content may be selected as defined by the tag <Genre> 03 to 17 and 18-19. The genre tag defines also the content type (film, series, magazine, news, etc.) and the weighting to select this content type. In our example, the first kind of content is "film" while the second is "series" and for both content types the weighting is 50, so that EPGs generated for this program time slot using the programming template will contains as many film as series.

As shown in 04 to 16 a specified genre may refined using subgenre tags which define a categories related to the type of parent genre. In the example shown three subgenres 04 to 12, 13-14 and 15-16 corresponding to the categories "western", "triller" and "comic". Moreover each genre as its own weighting (respectively 25, 25, and 0) which take into account the scope of the parent genre. In other words, as the parent genre has a weighting of 50 in the program time slot, western and thriller will have a weighting of 12.5 and comic a weighting of 25 in the same program time slot.

In a genre or subgenre predicates may be specified. These predicates are enclosed by the tag <Restrict> 05, 08 and <Exclude> 09, 11. In our example, selected westerns have to be produced between years 1960 and 1970 (06) with either "John Wayne" or "Gary Grant" as actors 07 and must not be produced in Italy or Japan 10. The next program time slot 21, 25 has a minimal duration of 30 mn, but this duration may be extended as the following program time slot has the parameter shiftable set to "forward" 26. <SourceTV> tag 23 indicates that the program in coming from a TV channel, which name is specified in attribute "channel". <SourceTV> does not mean that the user program will be synchronized with the TV channel. If playing time differs, the relevant TV channel will be recorded to be streamed later. If no source is generated under a <Genre> or <SubGenre>, the EPG generator will search video in its own asset catalog. Different source may be defined such as:

<SourceTV>
    <SourceInternet>
    <SourceRSS>
    <Source . . . . >

By extended application of the principles described above, a complete programming template may be defined for an extended period.

Once the programming sequence is defined at step 310, the method proceeds to step 320 at which the server instructs a client terminal associated with programming sequence to retrieve a first program item specified in the programming sequence from a specified location.

FIG. 4 shows schematically a programming template for one week. As shown, time slots of varying durations are defined for each day of the week so as to fully define desired programming between 17:00 and 01:00 each day. Naturally the daily period defined may be any period up to 24 hours. A different time period may be defined for different days of the week, for example defining a full 24 hrs at the weekend, but only evenings, or mornings and evenings during the week, or any other such pattern reflecting the viewing patterns of the user.

As shown in FIG. 4, for Monday from 17:00 to 20:00 the template calls for a cartoon, with "Walt Disney" cartoons having a 50% weighting. From 20:00 to 20:45 a news program is required, and from 20:45 to 24:00 a film is scheduled, with "western" films having a 25% weighting, "thriller" films having a 50% weighting and adventure having a 25% weighting. Cartoons are scheduled for the remaining time slot from 24:00 to 01:00. This pattern is repeated on Saturday and Wednesday, with the variation that on Wednesday the film slot extends to 01:00. For Thursday from 17:00 to 20:00 the template calls for sport, with "rugby" having a weighting of 15%, "football" having a weighting of 50%, and "car race" having a weighting of 35%. From 20:00 to 20:45 a news program is required, and from 20:45 to 23:00 a documentary is called for with "scientific" documentaries having a 15% weighting, "geographic" documentaries having a 50% weighting and "ethnic" documentaries having a 35% weighting. Further, sport fills the remaining slot from 23:00 to 01:00, with "rugby" having a weighting of 15%, "football" having a weighting of 50% and "car race" having a weighting of 35%. On Tuesday the program template starts with cartoons from 17:00 to 19:30, and a documentary from 19:30 to 22:00, with "scientific" documentaries having a 15% weighting, "geographic" documentaries having a 50% weighting and "ethnic" documentaries having a 35% weighting. A news program is required from 22:00 to 22:45, and sport fills the remaining slot from 23:00 to 01:00, with "rugby" having a weighting of 15%, "football" having a weighting of 50% and "car race" having a weighting of 35%. Friday begins with sport from 17:00 to 18:00, followed by a documentary from 17:00 to 20:30, with "scientific" documentaries having a 15% weighting, "geographic" documentaries having a 50% weighting and "ethnic" documentaries having a 35% weighting. This is followed by cartoon programming from 20:00 to 22:00. The news follows from 22:00 to 22:30, and is followed by a documentary from 22:30 to 01:00, with "scientific" documentaries having a 15% weighting, "geographic" documentaries having a 50% weighting and "ethnic" documentaries having a 35% weighting. Sunday begins with sport from 17:00 to 20:00, followed by cartoon programming from 20:00 to 22:00. The news follows from 22:00 to 22:30, and is followed by a documentary from 22:30 to 01:00, with "scientific" documentaries having a 15% weighting, "geographic" documentaries having a 50% weighting and "ethnic" documentaries having a 35% weighting.

Once the programming template has been generated at step 301 as described above, at a second step 302, a program item is selected for a given time falling within a respective the time slot. The program item is selected from a plurality of candidate program items, the program item identified as having content of the type associated with the one of the time slots. A group of program items are assessed with respect to their subject matter, and one program item identified as best matching the specified content type is selected. This assessment may comprise an automated assessment of the content of each program item, a keyword search of free text metadata, an automatically generated transcript etc., or may depend on a rigorous classification of all candidate program items, or any other suitable approach. The assessment may involve an Internet search, for example using a general purpose or video specific search engine, or access the search features proposed by a particular website, for example a web site hosting video content. The skilled person may envisage any number of weighting schemes and the like for the comparison of the results of these various assessments so as to may the final selection.

Naturally, whilst for each time slot a single program item is mentioned, a plurality of program items may be selected to completely fill a given time slot. This will often be the case for cartoon programming for example.

A further factor that may be taken into account in selecting a program item is a time or date associated with the time or date of the program items. In many cases more recent programming may be preferred, and in the case of news items for example this will be critical.

Content may be retrieved from any suitable source, including multicast and unicast streams as described above. Furthermore, the source may be "live", or be formed of recorded data. Again, in the case of news programming for example it may be desirable to retrieve data from a live source. One may imagine that in the example described with respect to FIG. 4 the news programming scheduled on Monday, Wednesday, Thursday and Saturday is from a live source, whilst on Tuesday, Friday and Sunday the live news program may be recorded for playback when required later in the evening.

According to certain embodiments the selection of a program item may be for immediate presentation to a user. In other words, by implementation of the described method a continuous programming stream emulating conventional television viewing experience may be generated on the fly on the basis of the programming template, with a first programming item being selected at the moment the user activates the viewing interface for example by turning on his television set, set top box or by opening a particular software application when the end of one program item is reached a new programming item may be selected, and so on. This approach is advantageous in that it retains fully the possibility of including new content as it becomes available without the risk of the user being confused by a change in scheduling.

According to certain further embodiments the selection of a program item may be iterated for future time slots as well as for immediate presentation to a user so as to generate a programming sequence of a number of program items. The programming sequence may correspond to a predefined period in advance such as the next hour, or the evening. The sequence may correspond to a certain number of program items, i.e., in order to indicate to the user what program item is coming next. Thus a respective program item is selected as having content of the type associated with each of the one of the time slots so as to define a complete programming sequence. This approach is advantageous in that it makes it possible to offer the user the opportunity to modify the selections apparent in the programming sequence in the case where he identifies a selection that for whatever reason does not suit him.

According to still further embodiments the selection of a program item may be iterated for all future time slots specified by the current programming template as well as for immediate presentation to a user so as to generate a programming sequence corresponding to a fully populated personalized electronic program guide. The programming sequence may correspond to a predefined period in advance such as the next hour, or the evening. The sequence may correspond to a certain number of program items, i.e., in order to indicate to the user what program item is coming next. This approach is advantageous in that it makes it possible to offer the user the opportunity to modify the selections apparent in the programming sequence in the case where he identifies a selection that for whatever reason does not suit him.

Figure 5:
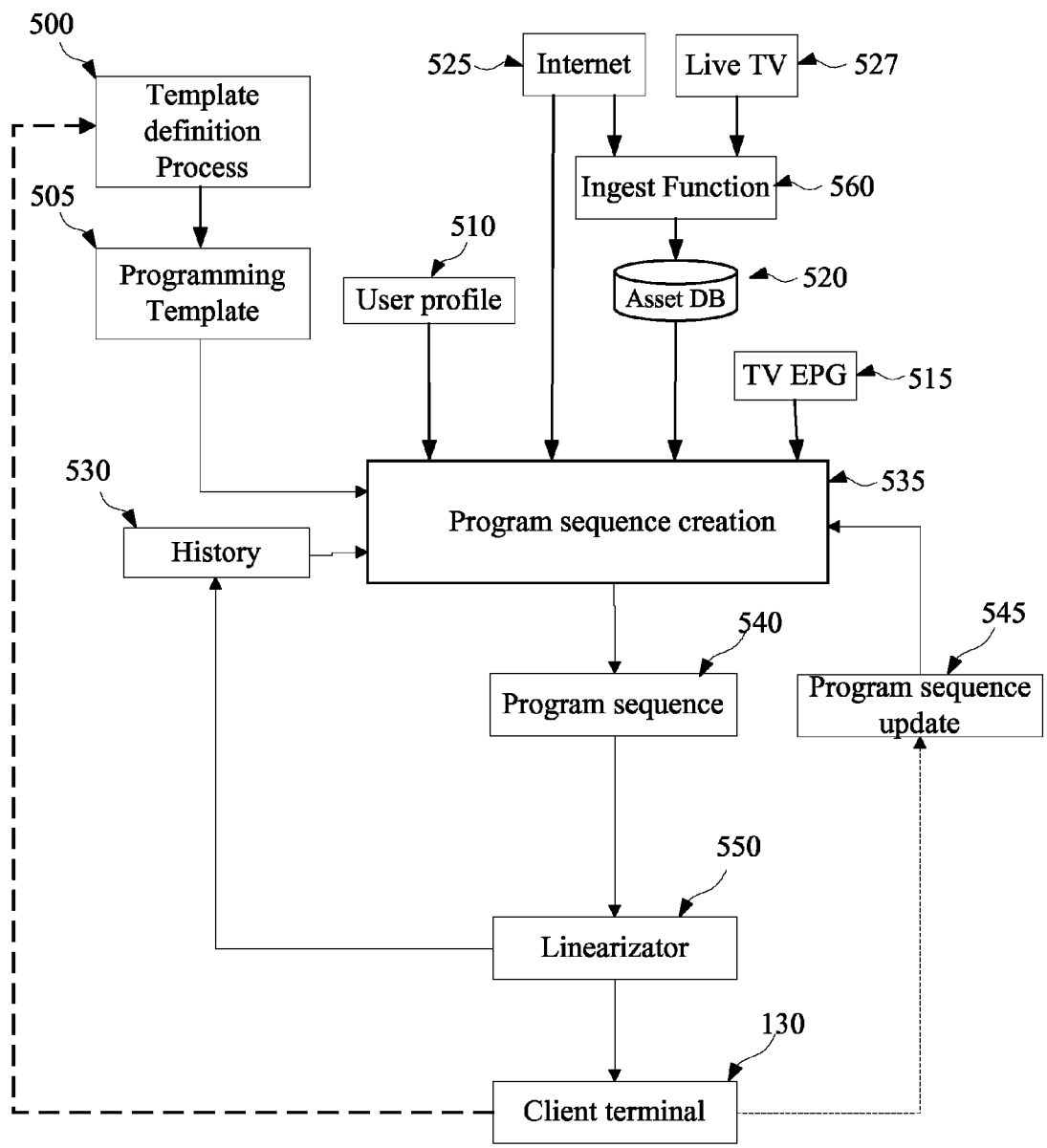
FIG. 5 shows functions and data suitable for creating such a programming sequence.

FIG. 5 shows functions and data suitable for creating such a programming sequence.

A template definition process 500 allows any user to define a programming template 505 for example as described above. Program sequence creation process 535 periodically generates a program sequence, based on input from personalized programming template 505, user profile 510, which defines interest centers and like of the user, and history file 530, which is updated every time that a program is watched. Using these three input selection sources, program sequence creation 535 implements queries against Metadata from standard TV channels EPG 515, asset meta data stored in it own asset database 520, and the Internet 525. A fourth process 545 allows the user to modify his/her personalized programming sequence. Linearizator 550 monitors the client terminal 560 to execute programs as defined in the personalized program sequence 505. The linearizator 550 updates history file 530 each time a new program is started.

Program sequence creation function 535 aims to generate a program sequence as described above from the user programming template 505 which defines the genre of program corresponding to time table of the day for all days of the week. Using the weight specified for the genres/subgenres extracted from programming template 505 and the history of asset played 530, the personalized program sequence creation function 535 calculates in the case of multi choice genre, which genre is to be selected. After that, using the user profile which describes the areas of user interest or liking, and asset metadata from several sources such as for example TV channel EPG 515, local asset database 520 and Internet 525, the program sequence creation function 535 selects a program item. Details concerning the selected program item such as a short description of the content, asset location or source of the asset, etc may be added. If a program item is not present in the asset database 520, ingest function 560 is invoked to ingest in the appropriate format the selected asset from source such as TV channel 527, Internet 525 and other sources.

There is further defined a user profile associated with a individual user, and the step of selecting may be carried out with reference to this user profile.

Each sequence generated for a subprogram must have at most the same duration as the time slot unless the next time slot has a shiftable start time. If the program item duration is less than the timeslot duration and the next timeslot start time is not backward shiftable, personalized advertising may be inserted after the program item. A respective time slot may be associated with a parameter indicating whether or not a time limit of the respective slot need be respected in the step of selecting, and wherein in a case where the parameter indicates that a time limit of the respective slot need not be respected, the selected program item may have a duration exceeding the duration of the respective time slot.

According to certain embodiments, the user may be given the option of modifying the program sequence.

Figure 6:
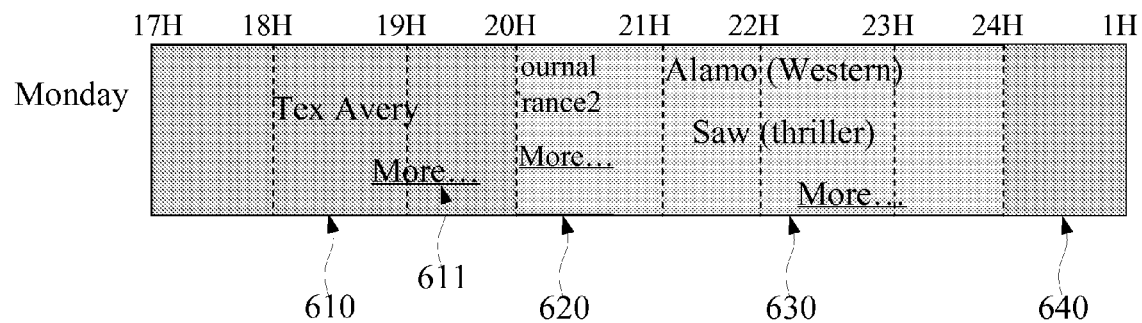
FIG. 6 shows how multiple candidate program items may be stored and presented to the user.

FIG. 6 shows how multiple candidate program items may be stored and presented to the user. As shown in FIG. 6, an EPG representing the programming sequence 540 prepared with reference to the programming template as described above is presented to the user. It is likely that during the selection process a number of suitable candidate programming items may be identified which would satisfy all relevant criteria. Each entry of the user template will provide more than one result and to avoid multiple search and let the user find out the best result marching it's a key aspect of the invention to let me tune the results allowing the system to enrich its user profile information. As shown, for each program entry the selected program item is displayed. In a case where a number of other suitable candidate program items were identified, the display may also provide an indication to this effect, for example in the form of the "more . . ." indicator as shown. In particular, the four time slots defined for this day are referenced 610, 620, 630 and 640 in chronological order respectively. Specifically, we can see that in populating the programming sequence for Monday on the basis of the template described above with reference to FIG. 4, the time slot 610 from 17:00 to 20:00 has been populated with a "Tex Avery" cartoon, etc. However, it may be imagined that a number of other cartoons would have been identified as nearly or equally as satisfactory, and this fact is indicated by the word "more" 611 below the words "Tex Avery". The skilled person will appreciate that this indication may be used as the basis of a wide range of user interface features enabling the user to review the alternative selections, and optionally make a replacement selection.

Figure 7:
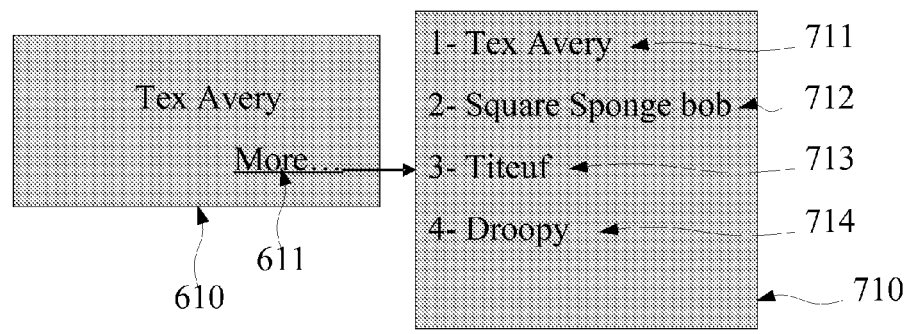
FIG. 7 represents a alternative selection review process.

FIG. 7 represents a selection review process. In this exemplary interface structure, the user may "click on" the "more . . ." indication 611 by means of a cursor moved by a mouse, joystick or the like, to cause a drop down list of the complete list 710 of programs matching its template request to be displayed. As shown the drop down list 710 proposes 4 candidates 711, 712, 713, and 714, from which the user may select. Then the user can either accept the pre-selection made for him or manually change it based on the proposed list of other programs available.

By allowing the user to modify selections in this manner, it becomes possible for the system to learn more about the user preferences as stored in the user profile 510 and enrich the next template in term of pertinence and accuracy to the user preferences. Thus a step of selecting may be carried out with reference to a record of previous associations between the individual user and candidate program items, where such data is stored in the user profile 510.

According to an embodiment, the programming template 505 is defined at step 310 by a user via a client terminal 130, a step of selecting takes place at a server, and the method comprises the further step of transmitting the programming template 505 from the client terminal 130 to the server.

Figure 8:
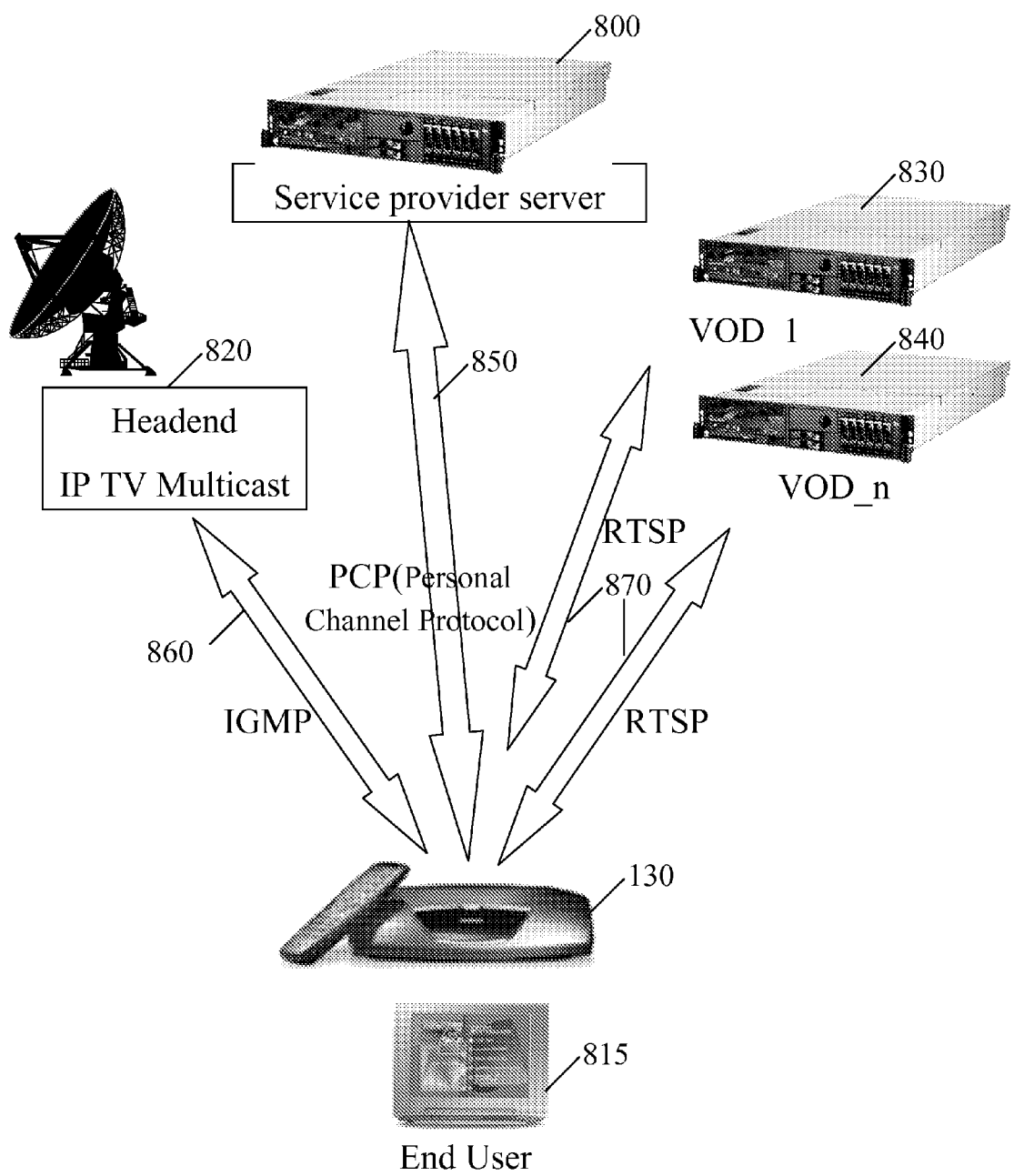
FIG. 8 shows the environment where a linearized personal channel is streamed.

FIG. 8 shows the environment where a linearized personal channel is streamed. Several source TV live 820 and VOD server 830, 840 may be accessed by a set top box (STB) 810 and displayed on the TV monitor 815 attached to the STB Different standard protocols are used to access these sources. IGMP 860 is used to access live TV (IP multicast), while RTSP 870 is used to manage unicast video streaming. Set top box 130 is connected to a service provider server 800 via a protocol, hereafter referred to as personal channel protocol (PCP) 850, which enables display of a personal channel based on a programming sequence.

Data representing a programming sequence is defined at the server 800, which may implement the functions and store the data referenced by some or all of 500, 505, 510, 515, 520, 525, 530, 535, 540, 545, and 550 above, and the server instructs the client terminal 130 to retrieve a program item specified in the programming sequence from a specified location, thereby implementing step 320 as described above.

Accordingly there is provided a method of presenting a continuous programming sequence at a client terminal comprising the steps of: defining a programming sequence at a server, with the server instructing the client terminal associated with the programming sequence to retrieve a first program item specified in the programming sequence from a specified location.

Table 1 below is a representation of data that may be used in reproducing for a user the programming sequence shown in FIG. 6 by linearizing content so as to create a personal channel. This table constitutes a playlist created with information relating to the programming sequence. Such a data set may be generated with reference to a programming sequence generated as described above.

TABLE 1

| Start time | Prot | Server group @ | Asset | Meta data |
|---|---|---|---|---|
| 17:00 | Unicast | VOD1 | Asset1 | "Egghead rides again" Tex Avery . . . |
| 20:00 | Multicast | 225.168.190.4 | N/A | |

TABLE 1-continued

| Start time | Prot | Server group @ | Asset | Meta data |
|---|---|---|---|---|
| 21:00 | Unicast | VODn | Asset2 | "Alamo" H. W. Kier, Norman Sheldon. |
| 24:00 | ... | ... | | |

"Start time" gives the time at which each program item is to start.
"Prot" indicates a specified transmission mode, e.g., whether a program is streamed in point to point "unicast", only for this user or if the program is multicast to a group of user, or otherwise.
"Server/Group@" gives the name or IP address of the VOD server on which the program item is in case of point to point streaming or the Internet group address when the content is multicast.
"Asset" is the name of the program item stored on the server. This name may be fully qualified with the path starting from the asset root directory.
"MetaData" may contains some or all of the meta data associated with the program item, such as:

---
Name of the film
Artist
Short description
...
---

Accordingly, the server instructs the client terminal to retrieve a program item by a specified transmission mode the specified transmission mode may be a multicast channel or a unicast channel for example.

It will be appreciated that this table may be used by both the linearizator to pilot the client device playlist and serve also to present the user personal EPG (personalized programming sequence) mainly the MetaData and timing information columns. On this basis MetaData information such as (program title, genre, MPAA, synopsis . . . ) is preferably provided for all entries even on live feeds (multicast) since such information will be used to present to the user with his personal EPG.

Data such as that shown in Table 1 above, necessary for the instruction of the client terminal 130 to retrieve a program item specified in the programming sequence from a specified location, may be transmitted program item by program item, that is, line by line, which a pause between transmissions while playback of each program item is executed, or instructions for a number of program items or for a predefined period, or for an entire programming sequence my be transmitted in one go to the client terminal 130. The table is used by the server to transmit command to the client terminal. When the server receives a Start_Personal_Ch, it retrieves the entry corresponding to the current time in the table associated to the client and according to information found in the entry generate a command Start_Play_Unicast or Start_Play_Multicast with the adequate parameters as described hereafter.

Thus the server instructs the client terminal to retrieve a further program item specified after a preceding program item in the programming sequence. The server may instruct the client terminal to retrieve the further second program item at the end of playback of the preceding program item.

Figure 9:
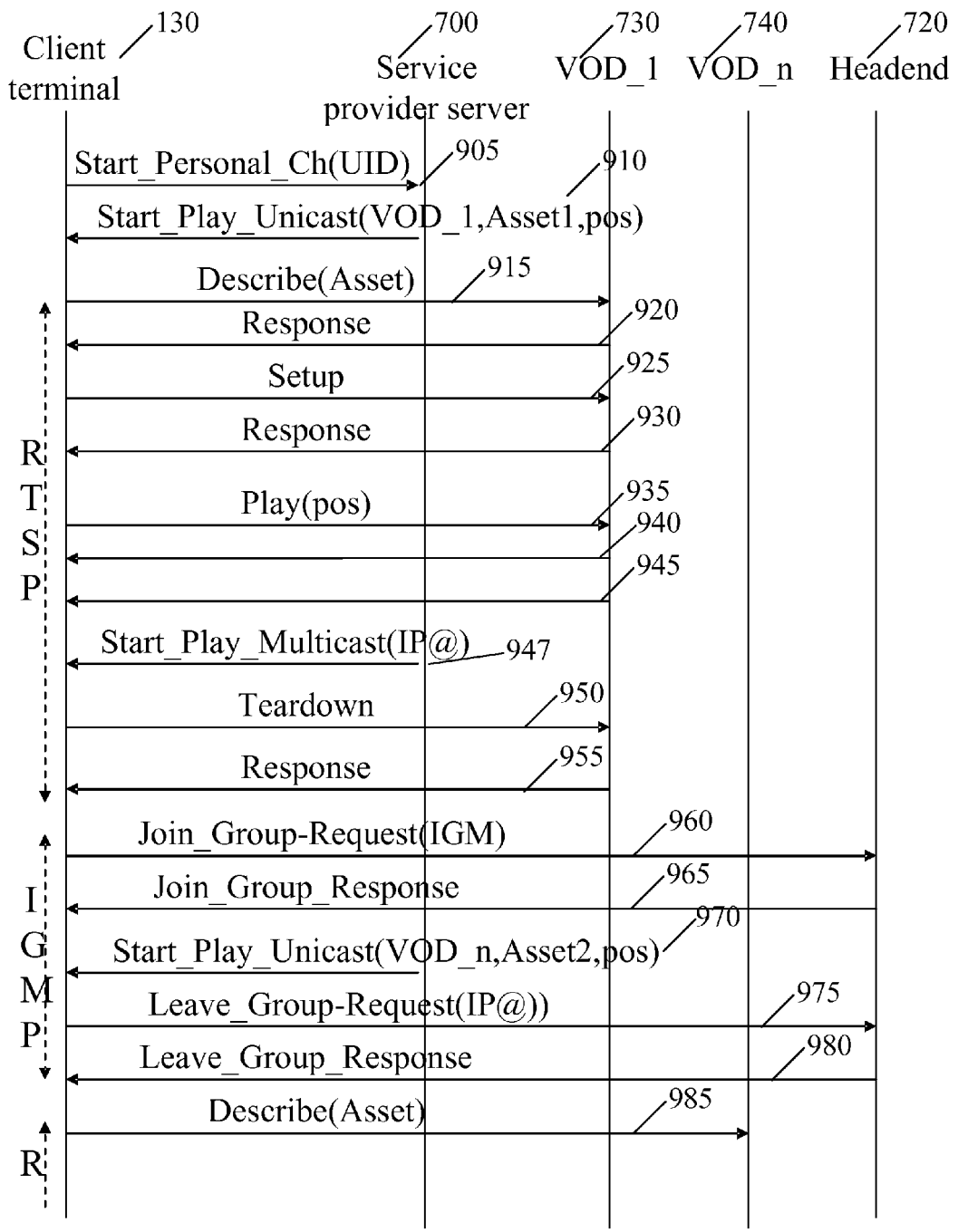
FIG. 9 shows a sample of messages exchanged between the client terminal and the service provider server.

FIG. 9 depicts the protocols between the user 900 and the service provider server 901 as well as the protocol between the user and the video on demand server 730, 740 and multicast group headend 720.

At step 905 user selects his own channel by sending the command "Start_Personnal_CH" to the service provider server 700. We assume this command is sent at 18H12. This command has the user identification "UID" as a parameter. This UID allows the server 700 to address all resources related to this user. In particular the play list as described with respect to table 1 above.

At step 910, the service provider server 700 identifies the program item to be played at the current time (entry 610 of the playlist) and in case of content to be streamed in point to point, calculates the elapsed time since the beginning of the video as defined in the programming sequence and sends the instruction "Start_Play_Unicast" to the client terminal 130 with three parameters which are respectively:

VOD server address, which is the VOD server which own the asset or which is the Master VOD server able to dispatch request on other VOD server which are under its control;
Asset, which is the name of the asset corresponding to the program; and
Pos, which is the time from the beginning of the asset where the streaming has to start. This time is calculated using the program start_time and the current time.

Pos=Current_Time−Start_Time.

in our example Pos=12 mn (18:12-18:00)

At this time the selected program item is recorded in the history file 530 as a consumed asset.

The client terminal 130 (or more precisely an agent running thereon) receives the command Start_Play_Unicast, and initializes an RSTP protocol to the server specified in the command, which is VOD_1 730. Client terminal 130 opens the content with the DESCRIBE 915 and SETUP 925 requests. The server's DESCRIBE response 920 provides parameters related to the media, such as the audio header and duration. The SETUP message transmits transport parameters and establishes a session with a unique session ID. Once the content is open, the client terminal sends a command play 935 with the position where the streaming has to be started as specified in the command Start_Play_Unicast received previously. Then the VOD server starts streaming of the asset 940.

At 20:00 the service provider server 700 analyzing the user playlist detects that another program item (entry 620 of the playlist) is due. As this program item is synchronous with the standard TV program and to minimize the bandwidth used, a multicast, command Start_Play_Multicast 947 is sent to user agent with the group multicast IP address as parameter.

The client terminal receives the command Start_Play_Multicast. 947, and firstly ends the RTSP protocol with the VOD server (VOD-1 920) by sending command Teardown 950. On reception of response from the VOD server 955, the client terminal enters multicast mode by sending the IGMP command Join-Group-Request 960 with the multicast group IP address as parameter. After the reception of the response 965, the client terminal is able to receive all IP packets with the multicast group IP address.

At 20:45 the server analyzing user playlist detects that another program item is due (entry 630 of the playlist). As this program is specified as unicast, command Start_Play_Unicast 970 is sent to client terminal with the same parameter as at step 910. Here the Pos parameter is equal to 0 as the current time is equal to the "Start_Time". User agent 900 on reception of Start_Play_Unicast 970, ends multicast reception by sending "Leave_Group_Request" 875. Then a new RTSP session is started with VOD_n 904, by sending describe command 985. Other exchange between the user agent and the VOD server are exactly the same as commands described in step 920 to 945.

According to the play list, user agent is able to change protocol and to manage sequentially unicast and multicast video stream.

The following Personal Channel Protocol commands may be envisaged inter alia:
From user agent to Service provider:
 Start_Personnal-Ch(UID)
 Stop
From Service provider to user agent:
 Start_Play_Unicast(Server,asset,pos)
 Start_Play_Multicast(IGM IP@)
Other commands may be added to support Time Shift function executed on server side.
From user agent to Service provider:
 Pause
 Play In case of a "Pause" command received by the server while the current played program is synchronous with a program of standard TV channel (case of multicast reception), the server has to create a new asset by recording the standard TV channel. In this case on the Play command, the protocol used to continue the reception of personalized TV channel will be RTSP.

Figure 10:
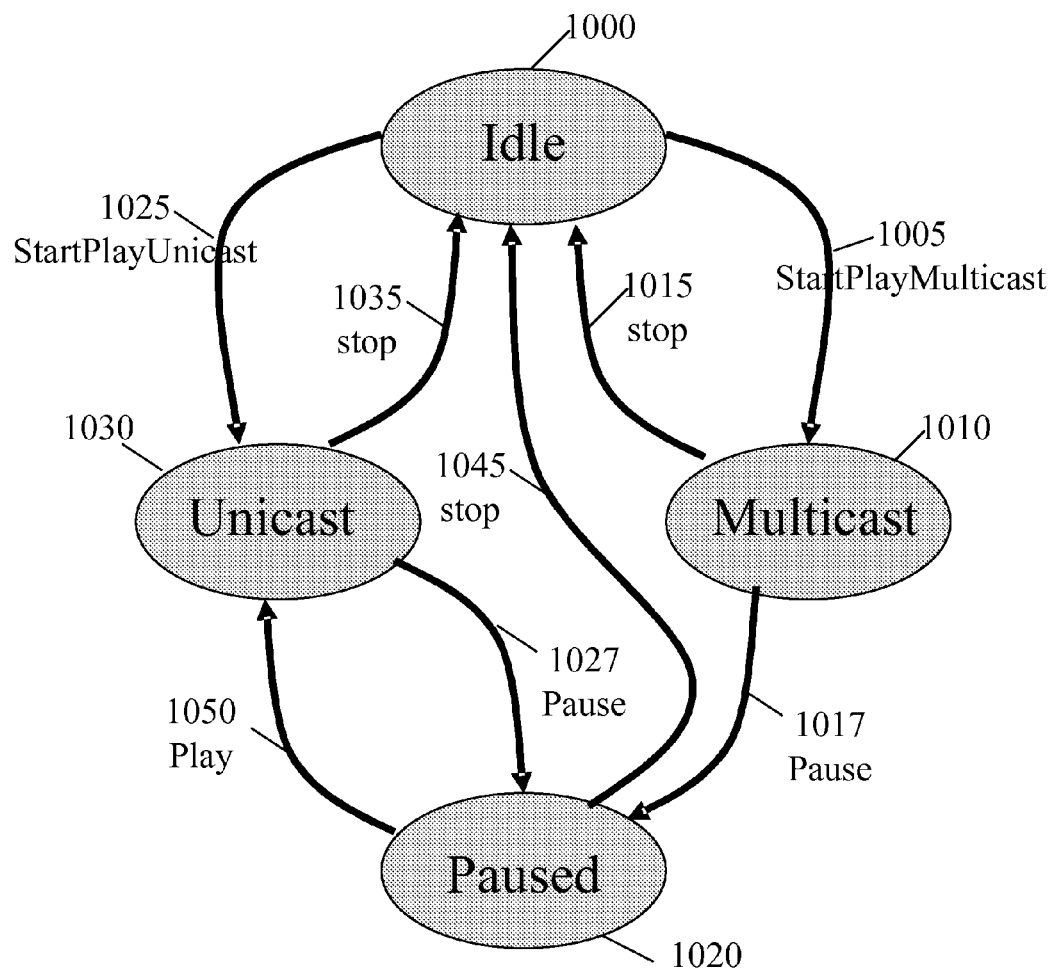
FIG. 10 shows a finite state machine of the service provider server for a personalized channel programs.

FIG. 10 shows a finite state machine of the Service provider server for a personalized channel.

State "Idle" 1000. In this status, the client terminal is not connected. As soon as a user starts a personal channel using the command "StartPersonalChannel, the service provider server identifies from the program sequence whether the content has to be played in unicast or if the user has to join a multicast group. If the content has to played in unicast, the command "StatPlayUnicast" 1025 is sent to the client terminal and the server state is changed to "unicast" 1030. Otherwise, the client terminal has to join a multicast group, command "StartPlayMultcast" 1005 is sent to the client terminal and the server state is changed to "multicast" 1010.

State "unicast" 1030. In this status user may stop playing personalized channel, either by a "power off" of the client terminal or TV equipment etc. or by changing to an other channel. Receiving "stop" 1035 command, the server state is changed to "idle" 1000. The user may also pause the channel to restart it later (time shift TV). In this case the client terminal sends a "pause" 1027 command to the server, which changes server state to "paused" 1020.

State "multicast" 1010. In this status user may stop playing personalized channel, either by switching off his/her TV equipment etc. or by changing to another channel. Receiving "stop" 1015 command, the server state is changed to "idle" 1000. User may also pause the channel to restart it later (Time shift TV). In this case user agent send "pause" 1017 command to the server, which changes server state to "paused" 1020 and starts a content recording of the channel previously received by the user.

State "paused" 1020. In this status user may stop playing personalized channel, either by power off his/her TV equipment or by changing to another channel. Receiving "stop" 1045 command, the server state is changed to "idle" 1000. The client terminal may also restart review of the channel by sending a "play" 1050 command to service provider server which change anyway it status to "unicast" 1030 even if previous protocol used was multicast. The Server responds by sending a "StartPlayUnicast" with content corresponding to the recorded channel.

Figure 11:
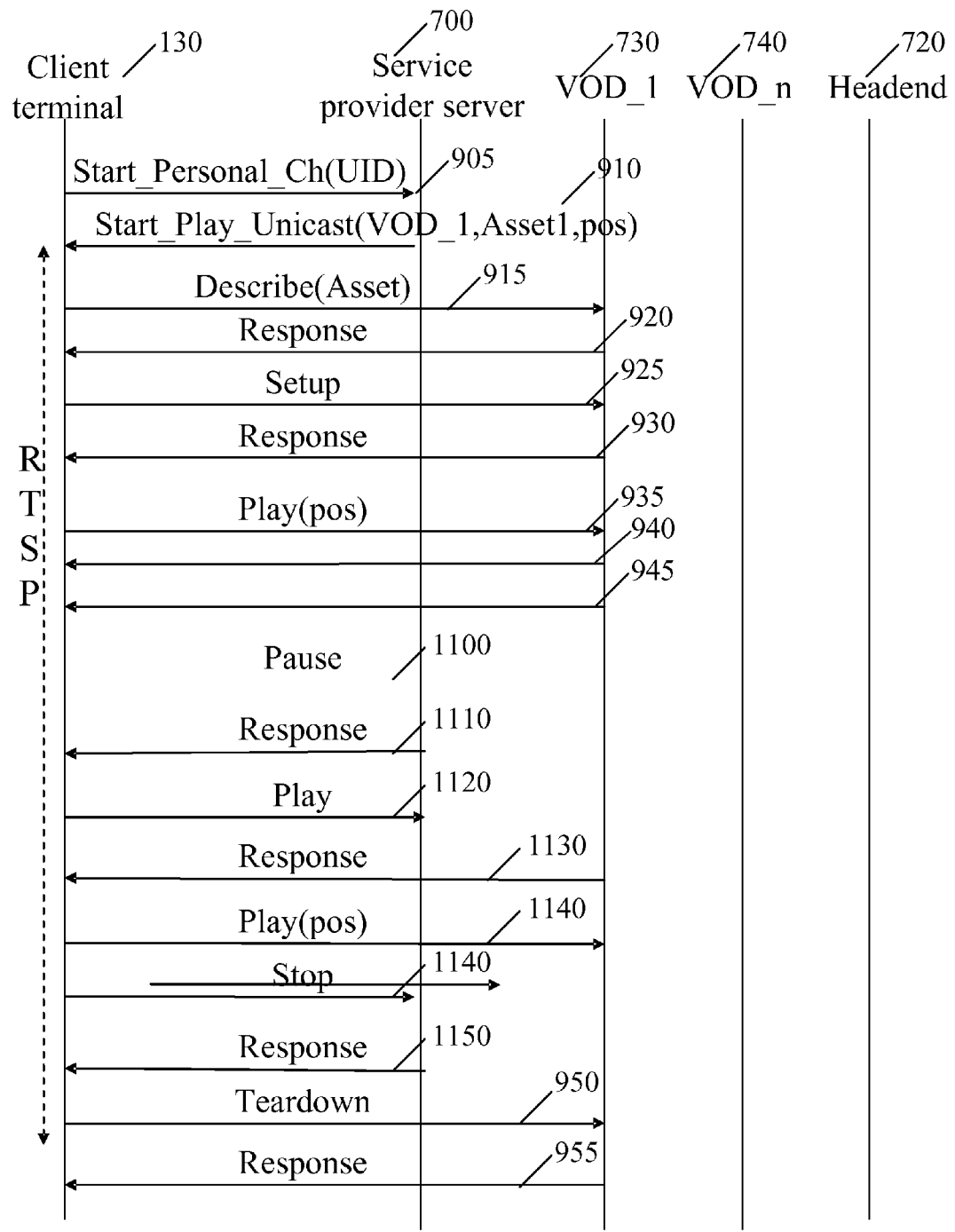
FIG. 11 shows the flow with time shift TV in unicast.
Figure 12:
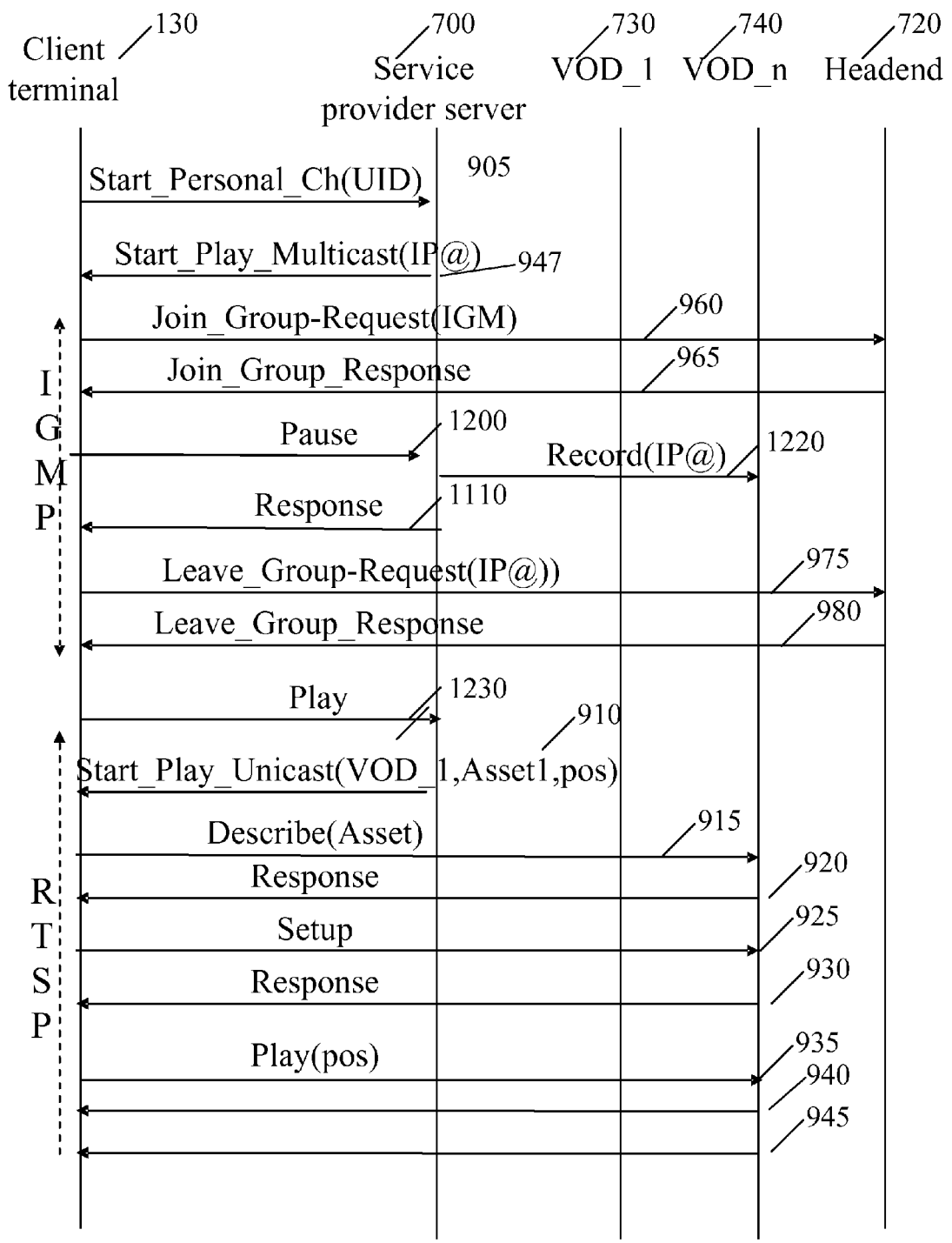
FIG. 12 shows the flow with time shift TV in multicast.

FIGS. 11 and 12 illustrate in two particular cases, the behavior of the finite state machine described above.

FIG. 11 shows the flow with time shift TV in unicast where a pause command is issued in RTSP mode. As shown here play command resumes (restart) the streaming in point to point.

FIG. 12 shows the flow with time shift TV in multicast where the pause command is issued while the user receives a broadcast channel (Live TV). In this case the server records the channel and when the user issues a play (restart) command the streaming continue in point to point using RTSP protocol.

It will be appreciated that a single server may manage a number of programming sequences for a number of different users, each of who may or may not use a different client terminal. Accordingly, the server may define a plurality of programming sequences and instruct a respective plurality of client terminals each associated with a respective the programming sequence.

According to a further embodiment there is provided a method of presenting a continuous programming sequence at a client terminal e.g. a set to box. A programming sequence, comprising program items from different sources such as live broadcast, stored data or content retrieved from the Internet is defined at a server, and the server instructs the client terminal associated with the programming sequence to retrieve each program item specified in the programming sequence from a specified location.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, or transport the program for use by or in connection with the instruction execution system, apparatus, or device.

The medium can be an electronic, magnetic, optical, electromagnetic, infrared, or semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The invention claimed is:

1. A method of presenting a continuous programming sequence at a client terminal comprising:

defining a programming sequence at a server using a programming template comprising a plurality of sequential time slots, each respective time slot being associated with a particular content type, the defining including selecting, for each respective time slot, a program item from a plurality of candidate program items;

wherein each respective time slot is associated with a parameter indicating whether or not a time limit of the respective time slot needs to be respected when selecting the program item from the plurality of candidate programs, wherein in a case where the parameter indicates that the time limit of the respective time slot need not be respected, and a parameter associated with a following program time slot indicates that the following program time slot can be shifted forward in time, the selected program item may have a duration exceeding the duration of the respective time slot, and wherein if a duration of the program item is less than the duration of the respective time slot and the next time slot start time is not backward shiftable, inserting personalized advertising after the program item to fill in the duration of the respective time slot; and the server instructing the client terminal associated with the programming sequence to retrieve a first program item specified in the programming sequence from a specified location.

2. The method of claim 1, wherein the server instructs the client terminal to retrieve the program item by a specified transmission mode.

3. The method of claim 2, wherein the specified transmission mode comprises a multicast channel or a unicast channel.

4. The method of claim 1, wherein the server instructs the client terminal to retrieve a second program item specified after the first program item in the programming sequence.

5. The method of claim 4, wherein the server instructs the client terminal to retrieve the second program item at the end of playback of the first program item.

6. The method of claim 1, wherein the server defines a plurality of programming sequences and instructs a respective plurality of client terminals each associated with a respective programming sequence.

7. A computer program stored on a non-transitory computer readable medium, which when executed, presents a continuous programming sequence at a client terminal, comprising program code for:

defining a programming sequence at a server using a programming template comprising a plurality of sequential time slots, each respective time slot being associated with a particular content type, the defining including selecting, for each respective time slot, a program item from a plurality of candidate program items;

wherein each respective time slot is associated with a parameter indicating whether or not a time limit of the respective time slot needs to be respected when selecting the program item from the plurality of candidate programs, wherein in a case where the parameter indicates that the time limit of the respective time slot need not be respected, and a parameter associated with a following program time slot indicates that the following program time slot can be shifted forward in time, the selected program item may have a duration exceeding the duration of the respective time slot, and wherein if a duration of the program item is less than the duration of the respective time slot and the next time slot start time is not backward shiftable, inserting personalized advertising after the program item to fill in the duration of the respective time slot; and the server instructing the client terminal associated with the programming sequence to retrieve a first program item specified in the programming sequence from a specified location.

8. A system of presenting a continuous programming sequence at a client terminal comprising:

a system for defining a programming sequence at a server using a programming template comprising a plurality of sequential time slots, each respective time slot being associated with a particular content type, the defining including selecting, for each respective time slot, a program item from a plurality of candidate program items;

wherein each respective time slot is associated with a parameter indicating whether or not a time limit of the respective time slot needs to be respected when selecting the program item from the plurality of candidate programs, wherein in a case where the parameter indicates that the time limit of the respective time slot need not be respected, and a parameter associated with a following program time slot indicates that the following program time slot can be shifted forward in time, the selected program item may have a duration exceeding the duration of the respective time slot, and wherein if a duration of the program item is less than the duration of the respective time slot and the next time slot start time is not backward shiftable, inserting personalized advertising after the program item to fill in the duration of the respective time slot; and the server instructing the client terminal associated with the programming sequence to retrieve a first program item specified in the programming sequence from a specified location.

9. The system of claim 8, wherein the server instructs the client terminal to retrieve the program item by a specified transmission mode.

10. The system of claim 9, wherein the specified transmission mode comprises a multicast channel or a unicast channel.

11. The system of claim 8, wherein the server instructs the client terminal to retrieve a second program item specified after the first program item in the programming sequence.

12. The system of claim 11, wherein the server instructs the client terminal to retrieve the second program item at the end of playback of the first program item.

13. The system of claim 8, wherein the server defines a plurality of programming sequences and instructs a respective plurality of client terminals each associated with a respective programming sequence.

* * * * *